Jan. 18, 1966 G. N. HOUNSFIELD 3,230,388

INTEGRATED STRUCTURE FORMING SHIFT REGISTER FROM REACTIVELY COUPLED ACTIVE ELEMENTS

Filed Sept. 11, 1961 4 Sheets-Sheet 1

Jan. 18, 1966 G. N. HOUNSFIELD 3,230,388

INTEGRATED STRUCTURE FORMING SHIFT REGISTER FROM REACTIVELY COUPLED ACTIVE ELEMENTS

Filed Sept. 11, 1961 4 Sheets-Sheet 4

United States Patent Office 3,230,388

Patented Jan. 18, 1966

3,230,388

INTEGRATED STRUCTURE FORMING SHIFT REGISTER FROM REACTIVELY COUPLED ACTIVE ELEMENTS

Godfrey Newbold Hounsfield, Newark, England, assignor to Electric & Musical Industries Limited, Hayes, England, a company of Great Britain Filed Sept. 11, 1961, Ser. No. 137,225
Claims priority, application Great Britain, Sept. 17, 1960, 32,042/60; Feb. 22, 1961, 6,415/61
19 Claims. (Cl. 307—88.5)

Figure 1:
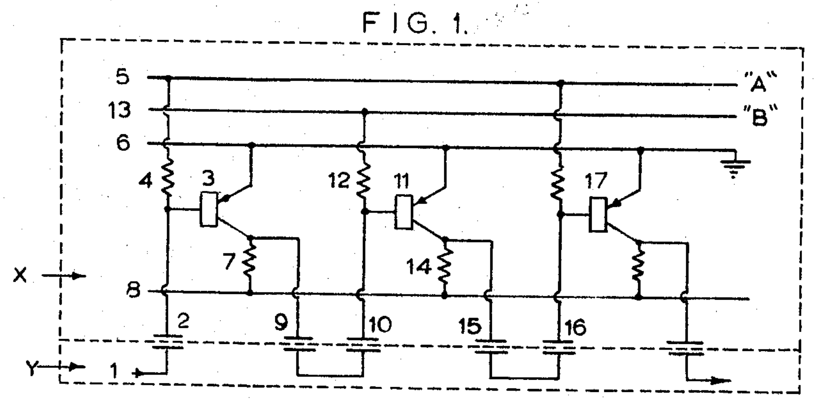

The present invention relates to electrical circuits and especially to circuits suited to the manipulation of digital data expressed in binary code form.

In both the manufacture and the maintenance of digital computers it is desirable that, as far as possible, the circuitry of the computer should comprise a multiplicity of identical circuit arrangements so that mass production methods may be used and the replacement of defective components simplified. Usually, the elements are arranged in a few different groups which occur many times in the design of the computer, each group being mounted on a printed circuit panel, interconnections between panels being achieved by means of connecting strips on the panels which engage contacts mounted on the panel supports. These interconnections add to the unreliability of the computer when they become corroded or dirty. A further disadvantage of this arrangement is that a number of different panels are required to be available for replacement purposes.

It is the object of the present invention to provide a circuit arrangement for a computer which reduces the above disadvantages.

According to one aspect of the present invention there is provided electrical apparatus comprising a first insulating support bearing a plurality of circuit parts, each circuit part having an input terminal and an output terminal, a first set of conducting elements connected to said circuit parts and adhering to said supports, there being at least one individual conducting element connected to the input terminal of each of said plurality of circuit parts and at least one individual conducting element connected to the output terminal of each of said plurality of circuit parts, a second insulating support and second set of conducting elements adhering to said second support, and signal transmitting means interconnecting elements of said second set, said supports being arranged in spacial proximity so that elements of said first set co-act with elements of said second set to form reactive couplings, whereby said circuit parts are interconnected by said reactive couplings and the signal transmitting means.

According to a second aspect of the present invention there is provided electrical apparatus comprising a first insulating support bearing a plurality of component circuits, a first set of conducting elements connected to said component circuits and adhering to said first support, said circuits having input and output connections and being responsive to electrical pulse signals on their input connections to produce electrical pulse signals on their output connections, input and output connections to said component circuits being connected to corresponding individual elements of said first set, a second insulating support, a second set of conducting elements adhering to said second support and signal transmitting means interconnecting elements of said second set, said supports being arranged in spacial proximity so that elements of said first set co-act with elements of said second set to form reactive couplings, said reactive couplings and the signal transmitting means being arranged to transmit pulse signals on the output connection of one component circuit to the input connection of another component circuit.

According to a further aspect of the invention there is provided electrical apparatus comprising the first insulating support bearing a plurality of like component circuits each having an input connection and an output connection, a first set of conducting elements, one corresponding to each input connection of said component circuits and one corresponding to each output connection of said component circuits, said elements being connected to the corresponding connections of the respective component circuits and adhering to said support, a second insulating support, a second set of conducting elements adhering to said second support, and signal transmitting means interconnecting elements of said second set, said supports being arranged in spacial proximity so that elements of said first set co-act with elements of said second set to form reactive couplings whereby said component circuits are interconnected by said reactive couplings and the signal transmitting means.

Figure 2:
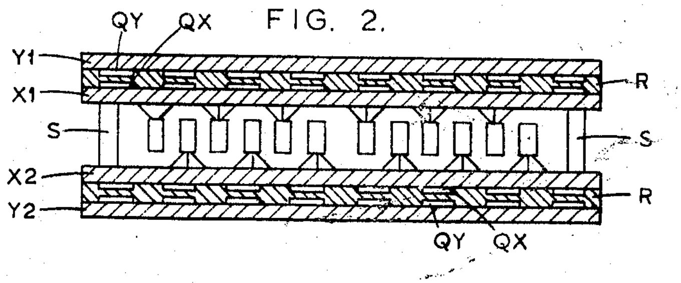
Figure 3:
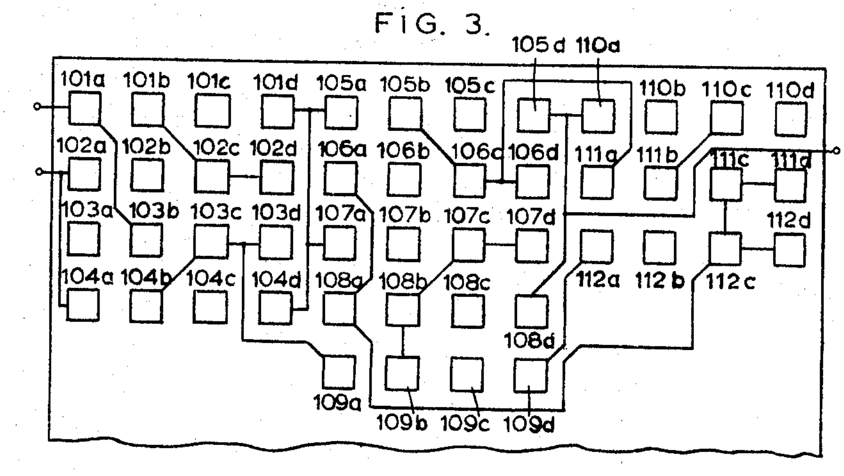
Figure 4:
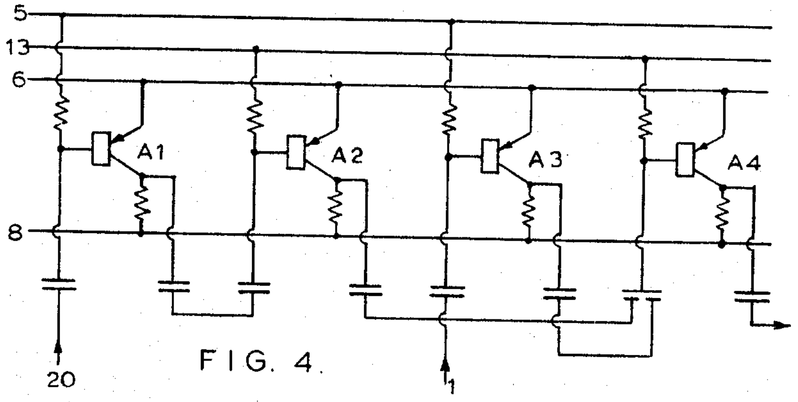
Figure 5:
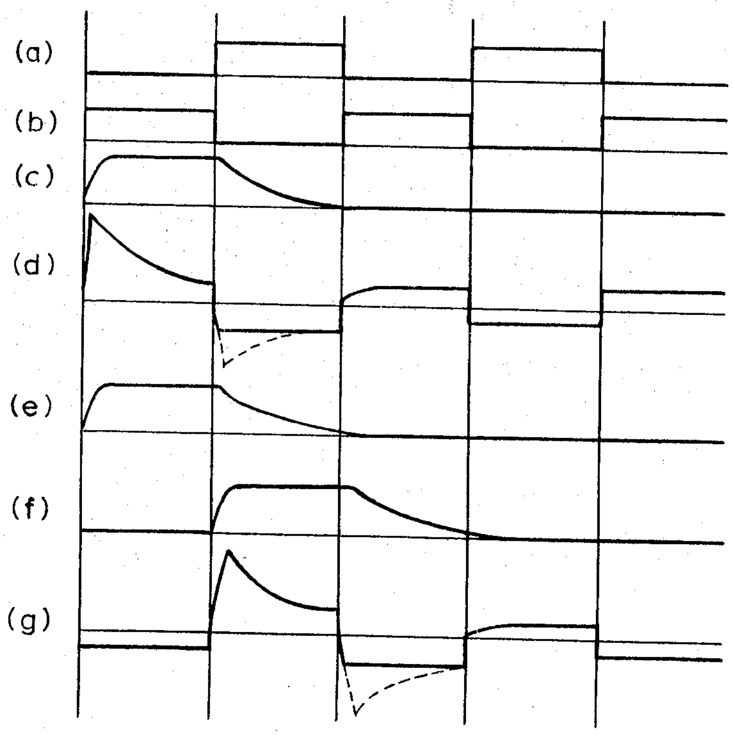
Figure 6:
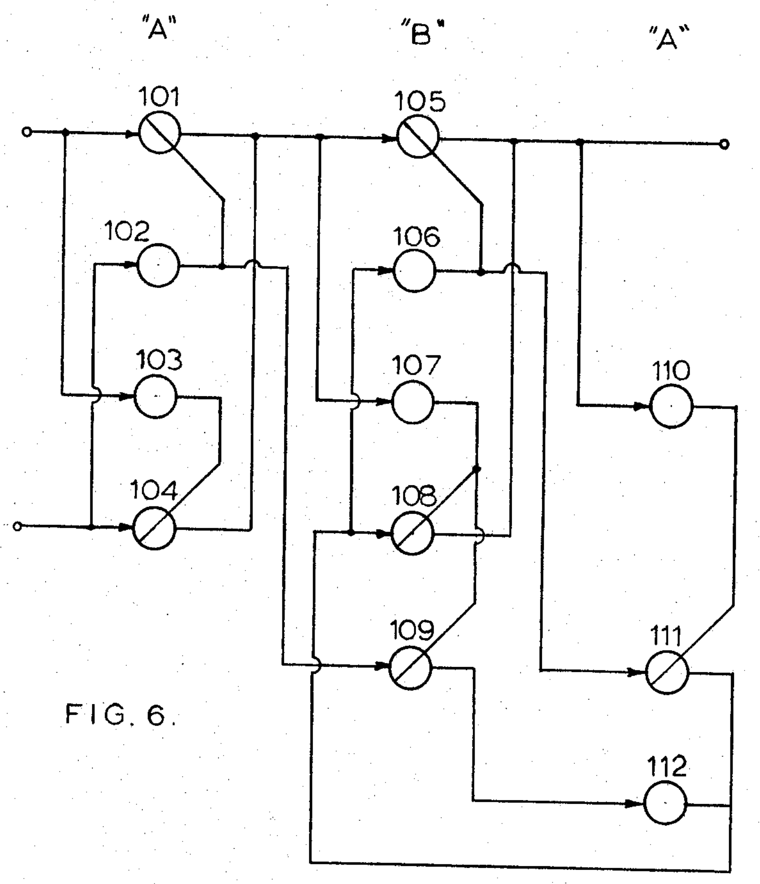
Figure 7:
Figure 8:
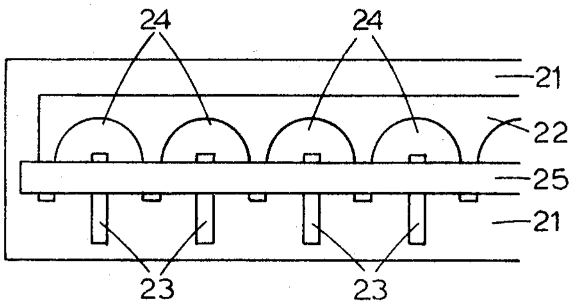
Figure 9:
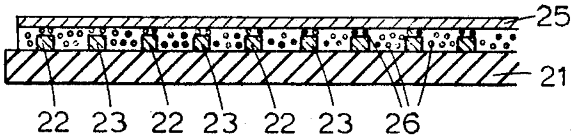
Figure 10:
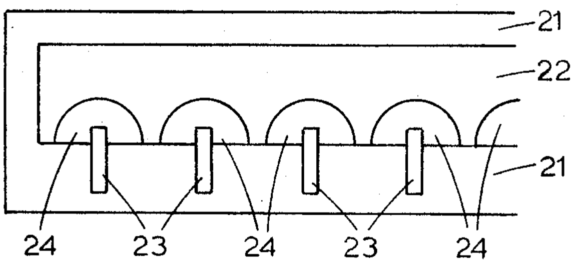
Figure 11:
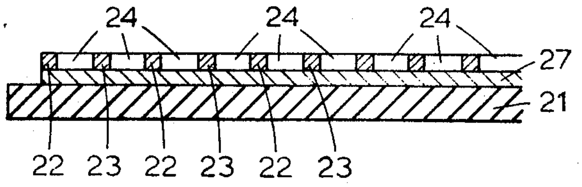

In order that the invention may be fully understood and readily carried into effect, it will now be described with reference to the accompanying drawings, of which:

FIGURE 1 represents a diagram of a circuit arrangement according to one example of the present invention, FIGURE 2 represents in diagrammatic form an example of a physical lay-out for the components of a circuit of the present invention, FIGURE 3 represents in diagrammatic form a part of the arrangement shown in FIGURE 2, FIGURE 4 is a circuit diagram of a modification of the invention, FIGURE 5 is a diagram of the waveforms of electrical signals at different points of the circuit under certain conditions, FIGURE 6 is a logical diagram of a binary adder, using inhibit gates as the only logical elements, FIGURES 7*a* and 7*b* show, in the notation used in FIGURE 6, a shifting register stage and an inhibit gate respectively, FIGURE 8 illustrates a plan of part of a printed circuit board which may be used in one embodiment of the invention, FIGURE 9 illustrates a section through part of FIGURE 8, FIGURE 10 illustrates a modification of FIGURE 8, and FIGURE 11 illustrates a section through part of FIGURE 10.

Referring now to FIGURE 1, which shows a circuit arrangement which functions as a shifting register, input signals in the form of serial binary coded pulses are applied to the terminal 1 and thence via the condenser 2 to the base electrode of transistor 3. The base of transistor 3 is also connected via resistance 4 to the "A" shift pulse line 5. The emitter of transistor 3 is connected to the line 6 which is connected to a point at reference potential. The collector of transistor 3 is connected via resistance 7 to a line 8 maintained at a suitable polarising voltage relative to said reference potential. The collector of transistor 3 is also connected via the serially arranged condensers 9 and 10 to the base electrode of transistor 11. The base electrode of transistor 11 is connected via the resistance 12 to the "B" shift pulse line 13. The emitter of transistor 11 is connected to the line 6, and its collector via resistance 14 to line 8 and also via the serially arranged condensers 15 and 16 to the base electrode of transistor 17.

The shift pluses "A" and "B" are both square waves, that is waves of equal mark and space, and are antiphase with respect to each other, but may be derived from the same source by any suitable means. The pulses cause the lines 5 and 13 to oscillate between two voltage levels, the one level being at about +½ volt so that a transistor to which this voltage is applied may conduct when an information pulse is applied to its base, and continue to conduct until the end of the shift pulse owing to "hole storage" and the time constant of the collector load of the previous stage and the base resistor together with the coupling condensers. The other level on the lines 5 and 13 is more positive than +½ volt and is such as to prevent a transistor to the base of which the voltage is applied from conducting on the application of an information pulse to its base, and also when applied to a transistor which is conducting as a result of "hole storage," will cause the transistor to cease conducting after a very short interval of time.

In operation, binary coded digital information in serial form is applied to the terminal 1, the digit period being equal to the cycle time of the shift pulses "A" and "B" in the usual manner. A "1" is indicated by a positive pulse which ends either just before or during the negative excursion of the shift pulses "A," and a "0" is indicated by the absence of such a pulse. The incoming information pulses are differentiated by the condenser 2 and resistance 4 so that a "1" becomes a positive pulse starting with the rise of the pulse applied at 1 and falling at a rate determined by the time constant of components 2 and 4, followed by a negative pulse starting with the fall of the pulse applied at 1. The negative pulse, at least partly lies within the period in which the transistor 3 is conditioned to conduct on the occurrence of such a pulse by the shift pulses "A." Therefore the transistor 3 starts to conduct on the simultaneous application of the differentiated "1" pulse and the negative excursion of the "A" shift pulses. The negative pulse produced by differentiation of the "1" pulse is of about the same duration as that of the negative excursion of the "A" shift pulse and the transistor continues to conduct heavily because of the time constant of components 2 and 4 and "hole storage" until the "A" shift pulse line 5 changes to its more positive level when the hole storage is rapidly terminated.

The voltage on the collector of transistor 3 is that of the line 8, say −12 volts with respect to that of line 6, when the transistor is not conducting, and rises to be almost that of line 6 when the transistor is conducting. Therefore the output signal of the transistor 3 has a datum level of −12 volts with positive pulses of about 11 volts amplitude indicating a "1," synchronised with the negative excursion of the "A" shift pulses and ending at about the same time as the negative excursions. A "0" is represented by no pulse.

The output signal of the transistor 3 is differentiated by the condenser consisting of the series combination of condensers 9 and 10, and the resistance 12, and the differentiated signal is applied to the base of the transistor 11. In a similar manner to that described with reference to the transistor 3, the negative pulses representing "1's" derived by differentiation, are overlapped by the negative excursions of the "B" shift pulses and cause the transistor 11 to conduct until the end of the negative excursion of the "B" shift pulses.

In this way the digital information is shifted from transistor to transistor along the chain. It will be understood that the output pulses from one transistor may be applied to more than one other transistor and that a transistor may derive its input pulses from more than one transistor.

Reference to the waveforms shown in FIGURE 5 may assist in the understandnig of the above description. It is pointed out that they are not drawn to the same voltage scale necessarily, but are intended to show the time relationship between the pulses.

5*a* represents the "A" shift pulses,
5*b* represents the "B" shift pulses,
5*c* represents the collector voltage of the transistor 3 passing the information "100,"
5*d* represents the waveform 5*c* when differentiated and combined with the "B" shift pulses and could be the information "100" as applied to the base of transistor 11,
5*f* represents the collector voltage of transistor 11 and
5*g* represents 5*f* differentiated and combined with the "A" shift pulses.
5*e* will be referred to subsequently.

The dotted sections of waveforms 5*d* and 5*g* are the parts which are normally clipped off by the base-emitter diodes of the transistor. The resistances 4, 12 and so on may be shunted by suitable condensers so that the shift pulses actually applied to the bases of the transistors will have a steeper leading edge. Alternatively, larger amplitude shift pulses may be used if catch diodes are connected to the bases of the transistors. In a modified arangement the shift pulses are applied to the bases through diodes in place of the resistors such as 4 and 12, the resistors remaining in circuit connected to the line 6 or a bias source to act as leaks. It will be appreciated that if the shift pulses are applied through diodes, or if catch diodes are used, the shift pulses need not be square waves but may be, for example, clipped sine waves.

It will be observed that in FIGURE 1 the circuit is divided into two parts one of which is enclosed in the dotted rectangle X and the other in the dotted rectangle Y. The dotted rectangles represent chassis members such as, for example, printed circuit panels, on which the components are mounted and it may be clearly seen that the coupling between the stages is achieved by the placing together of the two chassis members X and Y.

FIGURE 2 shows in diagrammatic form one example of an arrangement for the chassis members in which the transistors are placed between two spaced printed circuit panels X1 and X2 and connected thereto. The panels X1 and X2 each carry a number of capacitor plates QX which are capacitively coupled to other capacitor plates QY mounted on further printed circuit panels Y1 and Y2.

All of the component circuits mounted on panels X1 and X2 are identical and are connected to the polarising supply lines and to one or other of the shift pulse lines. A large number of such component circuits may be mounted on a single panel. In the present example the panel X1 carries transistors 3, 11, 17 and so on. The conductor 5, resistors like 4 and 7, conductors corresponding to 6 and 8, and conductive areas forming one plate of each of the coupling condensers 2, 9, 10, 15, 16 and so on are provided in the panel X1. The conductive areas forming one plate of the coupling condensers are denoted generally by the reference QX. The panel X2 is exactly similar to the panel X1, and carries a further series of transistors and the resistors and conductors associated with them. The panels X1 and X2 may be flexible and backed with rubber so as to ensure the close positioning of the plates QX and QY.

The interconnections between stages are mounted on the panels Y1 and Y2 and consist simply of a number of plates QY and interconnections between them in the manner required for the particular part of the computer. A plan view of a portion of such a panel is shown in FIGURE 3 which illustrates the connections required to produce the binary adder, the logical diagram of which is given in FIGURE 6. The plates QY bear the references 101*a*, 101*b* . . . 112*d* and form, in the assembly, the other plates of the coupling capacitors 2, 9, 10 and so on. Only a single connection is required from each QY plate to the next QY plate in a particular series, though there may in fact be connections from a QY plate to more than one other QY plate. It will be observed that the QY plates are arranged in sets of four, as are the corresponding QX plates. Each set of four condensers, consisting of corresponding sets of QX and QY plates, is connected to one component circuit, the "*a*" and "*b*" condensers being connected to the input, that is to say the base of the transistor, and the "*c*" and "*d*" condensers to the output, that is the collector of the transistor.

In a modification certain of the QY plates may be split into two or more sections, each section being connected to a different QY plate.

A dielectric R in the form of a thin sheet of a suitable material may be placed between the panels X1 and Y1, and X2 and Y2. Alternatively some spacer such as a raised portion on the panels may be provided so that the plates QX and QY are spaced by air or the plates QX and QY may be anodised. Spacers S may be provided so that the panels X1 and X2 are kept apart and a number of complete units clamped together with the Y1 panel of one unit against the Y2 panel of the next in a multiple sandwich arrangement, so as to economise space and simplify assembly.

In general, some sort of keying arrangement between the X and Y panels should be provided so that the plates QX and QY are exactly opposite one another and that the panels X and Y are orientated correctly with respect to each other when they are placed together.

When fitted into a computer the Y panels are wired permanently into circuit because they consist of nothing but connections which once made will not break down.

The X panel units which are all interchangeable and may be easily replaced in the event of a breakdown may be fitted with sockets for plugs carrying power supplies and shift pulses. It will be appreciated that the arrangement may be such that signals are passed from one X panel to another via a Y panel or shuttled between two X panels by means of a Y panel.

FIGURE 4 shows a circuit diagram of a modification of the arrangement of FIGURE 1 which operates as an inhibition gate. Since each stage is identical with the stages described with reference to FIGURE 1 it is not proposed to give a detailed description of them or their operation except where there are differences as a result of the modification.

The four stages are referred to as A1, A2, A3 and A4 and each is identical with one of the three shown in FIGURE 1. A comparison of FIGURE 4 with FIGURE 1 shows that the only differences are that the output of stage A2 is connected to stage A4 and not to A3 as would be expected from FIGURE 1, and that a second input signal is fed to the input of stage A3, with the output of A3 still being connected to A4.

Although the QY plate of the input condenser of the stage A4 may be connected directly to the QY plates of the output condensers of stages A2 and A3, in the preferred arrangement the QY plates of the output condensers of the stages A2 and A3 are connected via separate condensers to the base of the transistor of the stage A4, so that the output signals of stages A2 and A3 may be used separately for other purposes if required. The separate condensers connected to the base of the transistor A4 are the "*a*" and "*b*" condensers referred to with reference to FIGURE 3. One example of the connections for an inhibiting gate is shown in FIGURE 3 in which the stage 101 is arranged to operate as an inhibiting gate with the input to the condenser 101*a* inhibited by the output of the stage 102 by the application of the signals from the condensers 102*c* and 102*d* to the condenser 101*b*. Further examples of inhibiting gates may also be found in FIGURE 3.

In a modification of the above arrangement the QY plate may be arranged in two sections one connected to each input. This arrangement has the additional advantage of allowing the relationship between the two couplings to be other than equal by making the sections of the QY plate unequal, so that, for example, the inhibit pulse may be twice as large as the information pulse applied to the stage A4.

The waveforms shown in FIGURE 5 may be used to clarify the explanation of the operation of FIGURE 4, but since the waveforms are derived from not necessarily the same parts of the circuit as they were in FIGURE 1 an explanation of each as related to FIGURE 4 is now given:

*5a* represents "A" shift pulses,
*5b* represents "B" shift pulses,
*5c* represents the collector voltage of stage A3,
*5d* represents *5c* differentiated combined with the "B" shift pulses as applied to the base of the transistor of the stage A4, the dotted part of the waveform normally being clipped off by the base-emitter diode of the transistor,
*5e* represents the collector voltage of stage A1,
*5f* represents the collector voltage of stage A2, and

*5g* represents *5f* differentiated combined with "A" shift pulses, as applied to the base of the transistor of stage A4, the dotted part of the waveform normally being clipped off by the base-emitter diode of the transistor.

Information pulses to be gated are applied to the terminal 1 and passed through A3 to the input of A4, a "1" having the form shown in the first and second digit periods of waveform *5d* at this point, the negative going portion in the second digit period being the operative one.

Inhibiting pulses synchronised with the information pulses are applied to the terminal 20 and passed through A1 and A2 to the input of A4, where a "1" has the form shown in the second and third digit periods of waveform *5g*.

Since it is the negative going portion of the waveform of *5d* which would cause the transistor of stage A4 to conduct, then if there is a pulse from A2 at the same time giving the waveform shown in *5g* at the input to A4, the positive going pulse portion of *5g* during the second digit period will cancel out the negative going pulse shown in the second digit period of *5d* and the transistor of stage A4 will not conduct. In this way inhibition is achieved.

The negative going pulse portion of *5g* will tend to turn the transistor of A4 on just after the end of the negative excursion of the "B" shift pulse and therefore the transistor will not be switched on at all.

The references 5, 6, 8 and 13 have the same significance as they did in FIGURE 1.

With reference to the waveform on the collector of a transistor, an example of which is shown in FIGURE *5c*, it will be appreciated that the positive going edge of the pulse, produced by the turning on of the transistor, originates from the turning off of the previous transistor by the appropriate shift pulses, whereas the negative going edge of the collector waveform, due to the turning off of the transistor is derived from the shift pulses applied to the transistor itself.

Since transistors have a finite response time it will readily be inferred from the above that the positive going edge of the collector waveform will be more delayed in relation to the shift pulse causing it as it has had to pass through two transistors, than the negative going edge of the waveform in relation to the shift pulse causing it which has had to pass through only one transistor. As a result of this difference in delay, the negative pulse in waveform *5d* starts before the positive pulse in waveform *5g* and therefore the transistor in the stage A4 conducts briefly before the start of the inhibiting pulse from A2. As a result, a positive spike appears on the collector of the transistor of stage A4. However, if A4 is driving another stage this stage will be cut off by the shift pulses applied to it, unless the connection from A4 serves to inhibit the stage in which case the outut waveform from this other stage will be still further delayed in producing its output pulse. Because of this cumulative delay it is not recommended that more than two inhibit stages be connected in series, if a high shift pulse frequency is used. If the shift pulse frequency is relatively low these delays become of less consequence and more than two inhibit gates may be connected in series before the cumulative delay becomes large enough to upset the working of the circuits.

Although this modified circuit arrangement has been described as it would be applied to the circuit with the shift pulses arranged in one way, clearly the circuit would operate equally well with the shift pulses reversed.

Referring now to FIGURES 6 and 7 in conjunction with FIGURE 3 previously referred to, FIGURE 6 is a logical diagram of a serial binary full adder, consisting of two half adders. The elements 101, 102, 103, 104, 107 and 109 form one-half adder, and elements 105, 106, 107, 108, 110 and 111 form the other half adder. The element 112 is simply a delaying element. The elements 101 to 104 form a non-equivalence gate so that an output pulse is applied to the elements 105 and 107 if an input pulse appears on one and one only of the input terminals. The element 109 which is inhibited by the output from the non-equivalence gate functions as a "2" gate to produce an output pulse when an input pulse appears on both the input teminals.

Similarly, the elements 105 to 108 constitute a second non-equivalence gate and the element 111 functions as a "2" gate. The pulses represent the sum appearing at the output terminal connected to the element 105 and the carry pulses are derived from the elements 111 and 109 and are fed back to the elements 106 and 108. This circuit arrangement operates in the normal manner as a binary adder, the only difference from standard practice being that the "2" gates are replaced by serially connected inhibit gates.

FIGURE 7*a* illustrates in the notation used in FIGURE 6 a repeater element such as A1 or A2 in FIGURE 4.

FIGURE 7*b* illustrates in the notation used in FIGURE 6 an inhibiting stage such as is shown as A4 in FIGURE 4.

FIGURE 3 shows the interconnections of the QY plates necessary to produce the circuit arrangement of FIGURE 6. Bearing in mind that the "*a*" and "*b*" condensers are connected to the base of the transistor of the stage and the "*c*" and "*d*" condensers are connected to the collector of the transistor, the circuit diagram of FIGURE 6 may readily be traced on FIGURE 3.

The elements 101, 102, 103 and 104 are actuated by "A" phase shift pulses, the elements 105 to 109 by "B" phase shift pulses and elements 110 to 112 by "A" phase shift pulses. It will be noticed that the stage connected to inhibit another stage is responsive to the same phase of shift pulses as the stage being inhibited. This follows from a consideration of the operation of the inhibiting stage described with reference to FIGURE 4.

Although the four condenser plates corresponding to a given stage are shown arranged in a straight line, it may for some layouts be advantageous to arrange them at the corners of a square.

Since the elements are all identical to one another and each involves two resistances in addition to a transistor and possibly a diode, it is clearly desirable to be able to "print" a large number of equal resistances onto a printed circuit board so as to reduce the soldering necessary to produce the panels bearing the elements. Two methods by which such resistances may be "printed" are described with reference to FIGURES 8 to 11 inclusive.

Referring to FIGURES 8 and 9 of the accompanying drawings reference numeral 21 indicates an insulating board such as is commonly used in the construction of printed circuits, and upon which is deposited in known manner a conductive material 22, which is copper in the present example to form an elongated conductor in which recesses 24 are formed. Discrete terminals 23 are provided insulated from, but projecting into, the recesses 24. These are also formed by depositing copper in the board 21. An elongated carbon coated resistance card 25 is fixed by adhesive to the board as shown so that the card bridges the recesses from side-to-side and also overlies the terminals 23. The adhesive is an epoxy resin which adheres well to copper, and as an adhesive thickness of at least .003" is required the epoxy resin is mixed with conducting granules of diameter .003" to .004" which may be of graphite or metal, and applied to the surfaces to be fixed. The copper conductor 22 and the copper terminals 23 of the printed circuit board are a thickness greater than this particle diameter. When therefore the carbon coated card is applied to the surface of the board in the position shown and compressed upon it, the epoxy resin is squeezed out from above the conductor 22 and the terminals 23 until the particles 26 in FIGURE 9 provide conductivity through the adhesive between the carbon coated card 25 and the conductor 22 and terminals 23. The epoxy resin between the particles will have the required .003" thickness for good adhesion and will contract upon setting thus increasing the pressure of contact of the granules 26. At each join there may be up to 1,000 particles in contact. It will be appreciated that FIGURE 9 is not drawn to scale. There is, however, no lateral conductivity through the adhesive along the length of the resistance card 25 as the particles are not sufficiently numerous to provide conductivity over the relatively great distances involved. The conductor 22 and the terminals 23 may be deposited by any known circuit printing technique.

In the preferred method shown in FIGURE 10 the board 21 has a resistive layer such as chromium deposited on it by a known method such as by an evaporation and condensation process. The chromium or other resistive coating is then in turn coated with a conductive layer 22, in this embodiment silver being used, applied in the same or similar manner to that in which the chromium is applied to the insulating board. The silver film may then be thickened by electro-depositing more silver thereon as desired. The exposed silver surface is then coated with a resist in the pattern of the whole of the portions shown in FIGURE 10 by the references 22, 23 and 24. The films of silver and chromium are now removed by etching down to the surface of the board 21. The board is again covered with a resist over the areas indicated by reference numerals 22 and 23 in FIGURE 10 leaving uncovered the silver film on the areas 24. The uncoated silver is now removed by etching, but on this occasion the exposed chromium is not etched away. Finally when the resist is removed a circuit arrangement is provided which comprises, as shown in FIGURES 10 and 11, an elongated silver conductor 22 formed with a plurality of recesses 24, chromium resistive material 27 in the recesses in conductive contact with the conductor 22, and discrete terminals 23 in conductive contact with the resistive material 27. The chromium resistive material also lies underneath the conductor 22 and the terminals 23, but does not affect the function of the arrangement.

In another modification of the present invention which is not shown in the drawings, the capacity couplings may be replaced by inductive couplings, printed spirals being used instead of the plates QX and QY. The operation of the circuit is unchanged by this modification. By reversing the connections from one coupling spiral to another, a second type of inhibition gate may be produced.

In yet another modification the connections to the panels X may be eliminated by feeding the polarising voltage for the transistors and the shift pulses to the panel through inductive or capacitive couplings, shunt diodes being provided in known manner to restore the D.C. level. The polarising supply must, of course, be in the form of alternating current.

In a final modification the polarising supply is switched to provide collector current for odd and even sets of transistors alternately and the shift pulses "A" and "B"

replaced by a fixed bias, so that the effect of the switching of the polarising supply is the same as that of the shift pulses.

The modifications to the basic circuit arrangement may be used separately or in combination with one another to provide different features as may be required.

What I claim is:

1. Electrical apparatus comprising a first insulating support bearing a plurality of component circuits, each component circuit including an active semiconductor element circuit part having an input terminal and an output terminal, a first set of conductive elements connected to said component circuits and adhering to said support, there being at least one individual conductive element connected to an input terminal of each of said plurality of component circuits and at least one individual conductive element connected to an output terminal of each of said plurality of component circuits, a second insulating support and second set of conductive elements adhering to said second support, and signal transmitting means interconnecting conductive elements of said second set, said supports being arranged in spacial proximity and the conductive elements on said two supports being located so that the conductive elements of said first set co-act with respective conductive elements of said second set to connect an output terminal of at least a first of said component circuits to an input terminal of at least a second of said component circuits via two reactive couplings, each formed by one conductive element on each of said supports, said reactive couplings being connected in series by the signal transmitting means interconnecting the respective conductive elements on said second support, whereby said first and second component circuits are connected as successive stages of a signal translating circuit.

2. Electrical apparatus according to claim 1 wherein said reactive couplings are used for the storage of digitally coded information.

3. Electrical apparatus according to claim 1 wherein said reactive couplings are capacitive.

4. Electrical apparatus according to claim 1 wherein said reactive couplings are inductive.

5. Electrical apparatus according to claim 1, wherein said second support bears said second set of conductive elements and the interconnections therebetween only.

6. Electrical apparatus according to claim 1 wherein said supports are maintained in spacial proximity by spacers and the conductive elements of the first set are separated from the conductive elements of the second set by a layer of air, means being provided to maintain the supports in register with one another.

7. Electrical apparatus comprising a plurality of apparatus according to claim 6 arranged with their supports parallel to one another with pairs of supports of the same type adjacent.

8. Electrical apparatus according to claim 7, wherein conductive elements of the second supports are interconnected.

9. Electrical apparatus according to claim 1 wherein said supports are maintained in spacial proximity by pressure tending to force the supports together, the conductive elements of said first set being separated from the conductive elements of said second set by a layer of dielectric material, means being provided to maintain the supports in register with one another.

10. Electrical apparatus comprising a plurality of apparatus according to claim 9 arranged with their supports parallel to one another with pairs of supports of the same type adjacent.

11. Electrical apparatus according to claim 10, wherein conductive elements of the second supports are interconnected.

12. Electrical apparatus comprising a first insulating support bearing a plurality of component circuits, a first set of conductive elements connected to said component circuits and adhering to said first support, each component circuit including an active semi-conductor element having input and output connections and being responsive to electrical pulse signals on an input connection to produce electrical pulse signals on an output connection, input and output connections of said component circuits being connected to corresponding individual conductive elements of said first set, a second insulating support, a second set of conductive elements adhering to said second support and signal transmitting means interconnecting conductive elements of said second set, said supports being arranged in spacial proximity and the conductive elements on said two supports being located so that the conductive elements of said first set co-act with respective conductive elements of said second set to connect an output terminal of at least a first of said component circuits to an input terminal of at least a second of said component circuits via two reactive couplings, each formed by one conductive element on each of said supports, said reactive couplings being connected in series by the signal transmitting means interconnecting the respective conductive elements on said second support, whereby said first and second component circuits are connected as successive stages of a pulse signal translating circuit.

13. Electrical apparatus according to claim 12, wherein an output signal from said component circuits comprises a first pulse of one polarity followed by a second pulse of opposite polarity, said components being responsive to pulses of a particular polarity.

14. Electrical apparatus according to claim 13, wherein the output signals of first and second component circuits are applied to a third component circuit in such a way that the first pulse of the output signal of the first component circuit occurs simultaneously with the second pulse of the output signal of the second component circuit, whereby the response of said third component circuit to the output signal of one of said first and second component circuits is inhibited by the output signal from the other of said first and second component circuits.

15. Electrical apparatus according to claim 12, wherein said component circuits include shifting register stages.

16. Electrical apparatus according to claim 12, wherein said component circuits include logical elements.

17. Electrical apparatus according to claim 12 wherein said component circuits are electrically similar to one another and the transmission of information from one component circuit to another takes place through said reactive couplings only, whereby the function of the apparatus is determined by the interconnection between the conductive elements of said second set.

18. Electrical apparatus comprising the first insulating support bearing a plurality of like component circuits each including an active semiconductor element and having an input connection and an output connection, a first set of conductive elements, one correspondig to each input connection of said component circuits and one corresponding to each output connection of said component circuits, said conductive elements being connected to the corresponding connections of the respective component circuits and adhering to said support, a second insulating support, a second set of conductive elements adhering to said second support, and signal transmitting means conductive elements of said second set, said supports being arranged in spacial proximity and the conductive elements on said two supports being located so that the conductive elements of said first set co-act with respective conductive elements of said second set to connect an output terminal of at least a first of said component circuits to an input terminal of at least a second of said component circuits via two reactive couplings, each formed by one conductive element on each of said supports, said reactive couplings being connected in series by the signal transmitting means interconnecting the respective conductive elements on said second support, whereby said first and second component circuits are connected as successive stages of a signal translating circuit.

19. Electrical apparatus according to claim 18, comprising on said first support an electrical resistor arrangement comprising a common conductor which is provided with a plurality of recesses in the plane of the support, resistive material in said recesses in conductive contact with said conductor, and a plurality of discrete conductive sections in conductive contact with the resistive material in said recesses, whereby separate resistances are provided between the individual conductive sections and said common conductor.

References Cited by the Examiner

UNITED STATES PATENTS

| | | | |
|---|---|---|---|
| 2,894,077 | 7/1959 | McCoy | 317—101 |
| 2,967,267 | 1/1961 | Steinman et al. | 317—101 |
| 2,991,374 | 7/1961 | Demiranda | 307—88.5 |

FOREIGN PATENTS

| | | |
|---|---|---|
| 1,081,699 | 5/1960 | Germany. |

ARTHUR GAUSS, *Primary Examiner.*

JOHN W. HUCKERT, GEORGE N. WESTBY, *Examiners.*